(12) United States Patent
Li et al.

(10) Patent No.: US 6,554,113 B2
(45) Date of Patent: Apr. 29, 2003

(54) TORQUE LIMITING ACCESSORY DRIVE ASSEMBLY

(75) Inventors: Jin Li, Rochester Hills, MI (US); Christopher Blair, Waterford, MI (US); William Vukovich, White Lake Township, MI (US)

(73) Assignee: BorgWarner, Inc., Troy, MI (US)

( * ) Notice: Subject to any disclaimer, the term of this patent is extended or adjusted under 35 U.S.C. 154(b) by 0 days.

(21) Appl. No.: 09/961,457

(22) Filed: Sep. 20, 2001

(65) Prior Publication Data

US 2003/0051960 A1 Mar. 20, 2003

(51) Int. Cl.⁷ .............................. F16D 41/04
(52) U.S. Cl. .............. 192/48.92; 192/28; 192/56.6; 192/415; 192/70.2; 74/15.63
(58) Field of Search .................. 192/41 R, 41 S, 192/48.1, 48.2, 48.3, 48.92, 56.2, 56.6, 70.2, 84.81, 28; 74/11, 15.6, 15.63

(56) References Cited

U.S. PATENT DOCUMENTS

| | | | |
|---|---|---|---|
| 2,551,939 A | 5/1951 | Gerst .......................... 192/48 |
| 2,687,198 A | 8/1954 | Greenlee .................... 192/113 |
| 2,712,373 A | 7/1955 | Smirl ......................... 192/103 |
| 3,047,115 A | 7/1962 | Lee et al. ..................... 192/85 |
| 3,394,631 A | 7/1968 | Thompson ..................... 92/46 |
| 3,490,312 A | 1/1970 | Seitz et al. ................... 74/711 |
| 3,534,842 A | 10/1970 | Davison, Jr. ................ 192/113 |
| 3,589,483 A | 6/1971 | Smith ........................ 192/3.52 |
| 3,596,537 A | 8/1971 | Koivunen .................... 74/759 |
| 3,610,380 A | 10/1971 | Montalvo, III ............... 192/85 |
| 3,612,237 A | 10/1971 | Honda ......................... 192/85 |
| 3,654,692 A | 4/1972 | Goetz .......................... 29/558 |
| 3,765,519 A | 10/1973 | Kell ........................... 188/366 |
| 3,834,503 A | 9/1974 | Maurer et al. .............. 192/113 |
| 3,848,518 A | 11/1974 | Martin ........................ 92/107 |

(List continued on next page.)

FOREIGN PATENT DOCUMENTS

| | | |
|---|---|---|
| DE | 871 857 | 3/1953 |
| DE | 31 18 565 A1 | 11/1982 |
| DE | 31 49 880 C2 | 7/1985 |
| DE | 35 32 759 C1 | 3/1987 |
| DE | 35 26 630 A1 | 5/1987 |
| DE | 40 35 686 C1 | 1/1992 |
| DE | G 91 14 528.7 | 3/1992 |
| DE | 43 32 466 C2 | 2/1998 |
| DE | 195 02 617 C2 | 9/1998 |
| DE | 199 06 980.8 | 2/1999 |
| EP | 0 172 006 | 2/1986 |
| EP | 0 762 009 A1 | 3/1997 |
| EP | 0 848 179 A1 | 6/1998 |
| FR | 1.575.044 | 7/1969 |
| FR | 2.123.828 | 9/1972 |
| GB | 2 036 203 | 11/1980 |
| WO | WO 97/32678 | 9/1997 |
| WO | WO 99/45289 | 9/1999 |

Primary Examiner—Saul Rodriguez
(74) Attorney, Agent, or Firm—Bliss McGlynn, P.C.; Greg Dziegielewski

(57) ABSTRACT

A torque-limiting accessory drive assembly comprising a pulley to transfer torque to an accessory drive system, a torque limiting device adapted to limit the maximum amount of transferred torque, and a one-way clutch assembly adapted to both selectively transfer torque and selectively interrupt torque transfer at predetermined times to the vehicle accessory drive.

19 Claims, 3 Drawing Sheets

U.S. PATENT DOCUMENTS

| | | | |
|---|---|---|---|
| 4,205,739 A | 6/1980 | Shelby et al. | 192/113 |
| 4,219,246 A | 8/1980 | Ladin | 308/219 |
| 4,270,647 A | 6/1981 | Leber | 192/113 |
| 4,301,904 A | 11/1981 | Ahlen | 192/70.12 |
| 4,361,217 A | 11/1982 | Bieber et al. | 192/103 |
| 4,372,434 A | 2/1983 | Aschauer | 192/85 |
| 4,392,840 A * | 7/1983 | Radocaj | 474/117 |
| 4,501,676 A | 2/1985 | Moorhouse | 252/12 |
| 4,640,478 A | 2/1987 | Leigh-Montstevens | 248/27.1 |
| 4,667,534 A | 5/1987 | Kataoka | 74/711 |
| 4,667,798 A | 5/1987 | Sailer et al. | 192/70.12 |
| 4,700,823 A | 10/1987 | Winckler | 192/107 |
| 4,732,253 A | 3/1988 | Hiramatsu et al. | 192/87.11 |
| 4,733,762 A | 3/1988 | Gay et al. | 192/98 |
| 4,808,015 A | 2/1989 | Babcock | 384/609 |
| 4,813,524 A | 3/1989 | Reik | 192/106.2 |
| 4,827,784 A | 5/1989 | Muller et al. | 74/330 |
| 4,856,635 A | 8/1989 | Vlamakis | 192/70.12 |
| 5,152,726 A | 10/1992 | Lederman | 475/324 |
| 5,174,420 A | 12/1992 | DeWald et al. | 188/264 |
| 5,267,807 A | 12/1993 | Biedermann et al. | 403/375 |
| 5,305,863 A | 4/1994 | Gooch et al. | 192/70.12 |
| 5,423,405 A | 6/1995 | Fukaya | 192/98 |
| 5,466,195 A | 11/1995 | Nogle et al. | 475/55 |
| 5,469,943 A | 11/1995 | Hill et al. | 188/264 |
| 5,495,927 A | 3/1996 | Samie et al. | 192/70.12 |
| 5,538,121 A | 7/1996 | Hering | 192/70.12 |
| 5,577,588 A | 11/1996 | Raszkowski | 192/113.35 |
| 5,613,588 A | 3/1997 | Vu | 192/113.35 |
| 5,653,322 A | 8/1997 | Vasa et al. | 192/85 |
| 5,662,198 A | 9/1997 | Kojima et al. | 192/87.11 |
| 5,711,409 A | 1/1998 | Murata | 192/87.11 |
| 5,755,314 A | 5/1998 | Kanda et al. | 192/70.12 |
| 5,899,310 A | 5/1999 | Mizuta | 192/107 |
| 5,918,715 A | 7/1999 | Ruth et al. | 192/46 |
| 6,000,513 A * | 12/1999 | Richards | 192/61 |
| 6,024,196 A * | 2/2000 | Miyata | 192/41 R |
| 6,044,943 A * | 4/2000 | Bytzek et al. | 192/212 |
| 6,244,407 B1 | 6/2001 | Kremer et al. | 192/70.12 |

* cited by examiner

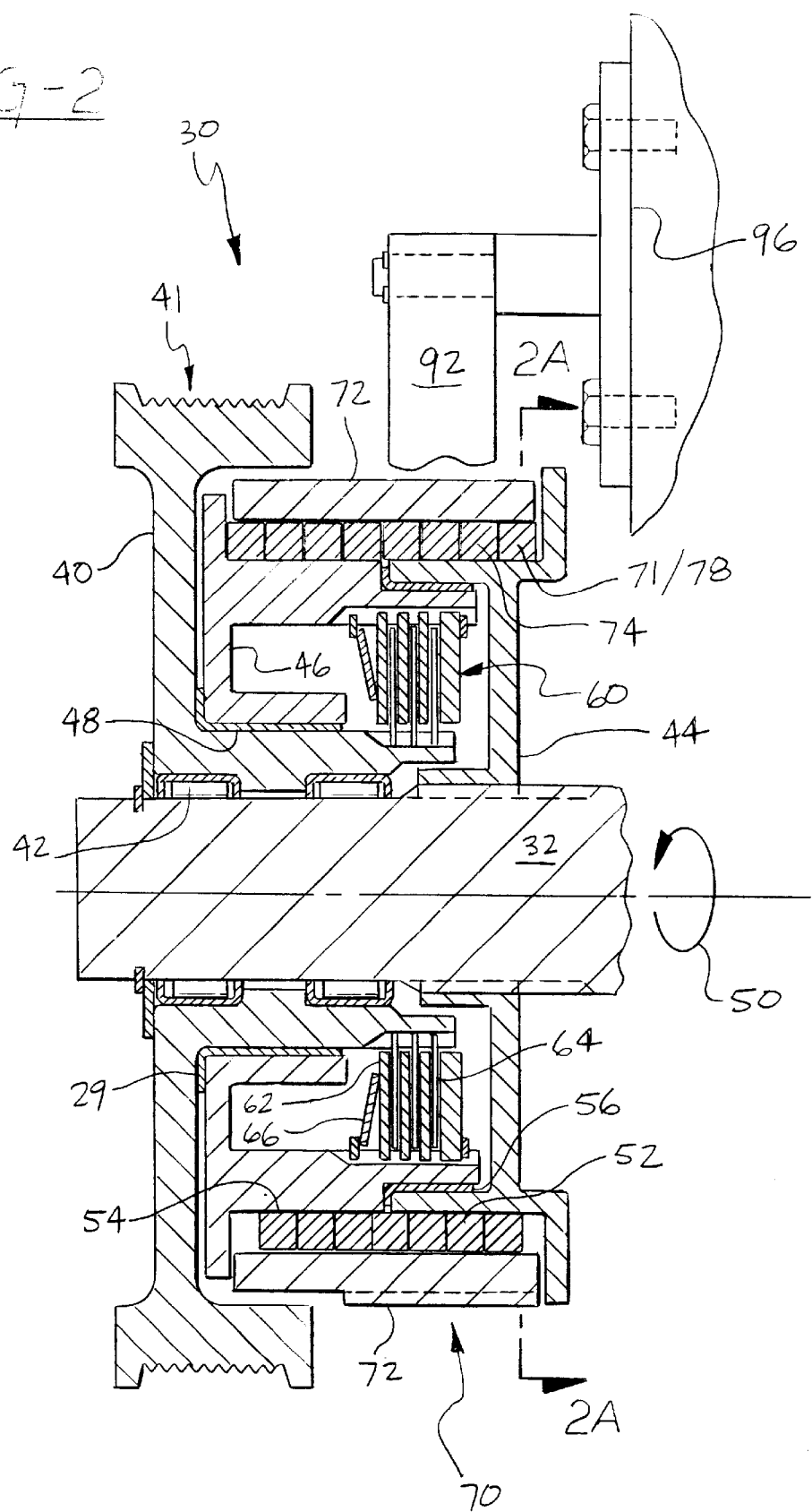

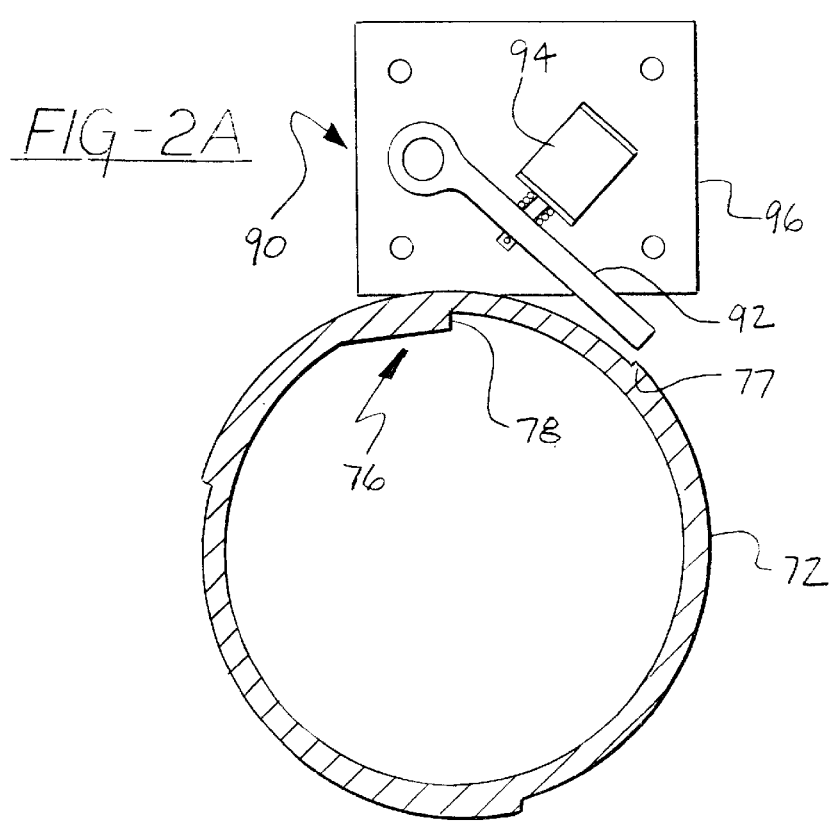
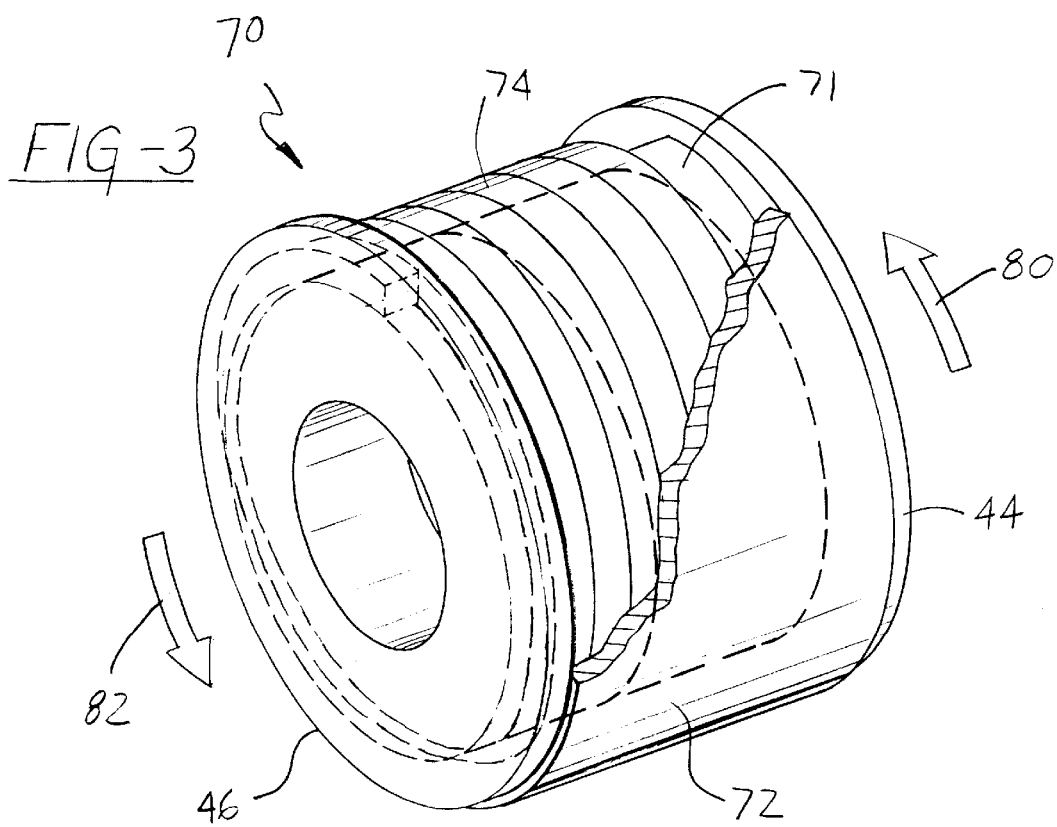

TORQUE LIMITING ACCESSORY DRIVE ASSEMBLY

FIELD OF THE INVENTION

The present invention relates generally to an accessory drive assembly and, more specifically, to a torque-limiting accessory drive assembly for the accessory drive system of an engine of a motor vehicle.

DESCRIPTION OF THE RELATED ART

In automotive applications, engine torque and speed are translated from a prime mover, such as an internal combustion engine, to one or more wheels through the transmission in accordance with the tractive power demand of the vehicle. In addition to supplying power to move the automotive vehicle, the engine drives a variety of accessories, such as; the power steering pump; air conditioning compressor; cooling fan; water pump; alternator; and any other engine driven accessory. These various accessories are usually operatively belt driven via one or more pulley systems deriving their power source from an engine power take-off, typically a crankshaft pulley. In conventional accessory drive systems engine power is constantly supplied by the crankshaft pulley to the belts. Some of the driven accessories are fitted with clutch assemblies to lessen the mechanical load and drain on engine power when they are not needed (e.g., air conditioning compressor and cooling fan). However, clutches have yet to be employed at the power take-off from the engine that drives such accessories.

As certain drivetrain technologies have developed, there has become a need in the art to selectively interrupt power to the driven accessories as well as selectively initiate or return power to the driven accessories. One example of such a situation involves the use of automated manual transmissions in automotive applications. These types of transmissions automate the moving of shift forks and clutches so that the operator is not required to manually disengage the engine from the transmission by depressing a clutch pedal nor by moving a shift lever to change gears. As in more conventional transmissions, during a transmission upshift, engine speed is governed by throttle position while transmission speed tends to remain essentially constant. This is due to the fact that the transmission remains engaged to the driving members and wheels, and these parts will initially sustain transmission speed then, being subject to frictional and drag forces, will slowly decrease transmission speed accordingly, the longer the transmission is decoupled from the engine. Once the next gear is selected, the transmission and engine speeds must be synchronized. The gear change upward will cause the transmission to have a lower input speed requirement. As the clutch mechanism is re-engaged the engine is commanded to a lower throttle setting to match the required input speed to the transmission. This approach relies on the slow or unpredictable loss of engine speed by either mechanical factors or a driver input to the throttle setting and while this is generally accepted in the related art, it is inefficient. When the engine and transmission speeds are relatively the same, the clutch is engaged, recoupling the engine to the transmission and delivering torque to the drivetrain. The process works but has room for improvement.

Additionally, automated manual transmissions suffer from the problem of noticeable torque interrupt during shifting, unlike that which occurs in a fully automated transmission or which can be compensated for in a fully manual transmission. This phenomenon adversely affects the "feel" of the vehicle during shifting and is undesirable from an operator's viewpoint. Beyond the feel of a transmission shift, other adverse effects of a delayed and hard torque transfer can damage or reduce the efficiency of the vehicle's accessory components. More specifically, when conventional accessory drive systems are employed excessive mechanical forces and stresses are often transferred to the accessories through the belt drive. This is due to the fact that, in conventional systems, the accessories are constantly connected and constantly driven. In such systems commonly employed in the related art, when the engine speed increases or decreases sharply, a quick change in torque is applied to the accessory components. This spikes, or sharply peaks, the load on the various accessories. These rapid load shifts can cause excessive or rapid wear in accessory bearings and the belt materials as well. Therefore, there is a need in the art for a device that can limit the torque transfer from the engine to the accessories.

Alternatively, it is often desirable to maximize power at vehicle launch. The engine driven accessories noted above have the undesirable effect of draining power that could otherwise be delivered to the drivetrain in this operating mode. Thus, there remains a need in the art for a device that selectively interrupts power to the driven accessories as well as selectively initiates or returns power to the driven accessories in an automotive application.

SUMMARY OF THE INVENTION AND ADVANTAGES

The present invention overcomes the disadvantages and drawbacks in the related art as a torque-limiting accessory drive assembly including a pulley adapted to transfer torque from the power take-off of an internal combustion engine to an accessory drive system, and a torque limiting device operatively connected to the pulley. The torque limiting device is adapted to limit the maximum amount of torque transferred from the power take-off of an internal combustion engine to the pulley. The assembly also includes a one-way clutch assembly operatively interposed between the engine power take-off and the torque limiting device. The one-way clutch assembly acts to selectively transfer torque from the power take-off to the torque limiting device thereby providing motive force to the pulley and vehicle accessory drive, and acts to selectively interrupt torque transfer at predetermined times.

The torque-limiting accessory drive assembly of the present invention therefore overcomes the disadvantages of conventional designs in two ways. First, the torquelimiting accessory drive assembly of the present invention is selectable in its engagement and disengagement, thereby allowing controlled interruption of the engine torque supplied to the accessories. Second, the multi-plate friction clutch provides for selective adjustment of the maximum torque transfer capacity. Furthermore, it does this without the need for supplying hydraulic power, which is the typical mechanism used to apply multi-disc friction clutches known in the art. The wrapped spring type, one-way clutch of the present invention can operate at high speeds over a wide range of temperatures. In addition, by using the one-way, spring clutch technology, the torque-limiting accessory drive assembly of the present invention is small and lightweight, having long life with an efficiency that is virtually unchanging.

BRIEF DESCRIPTION OF THE DRAWINGS

FIG. 2 is a cross-section view of a the torque-limiting accessory drive assembly of the present invention;

FIG. 2A is a cross-section, cut-away view of a disengagement sleeve of the torque-limiting accessory drive assembly of the present invention;

FIG. 3 is an oblique, partial view of a one-way clutch assembly employed in the torque-limiting accessory drive assembly of the present invention.

DETAILED DESCRIPTION OF THE PREFERRED EMBODIMENT

Figure 1:
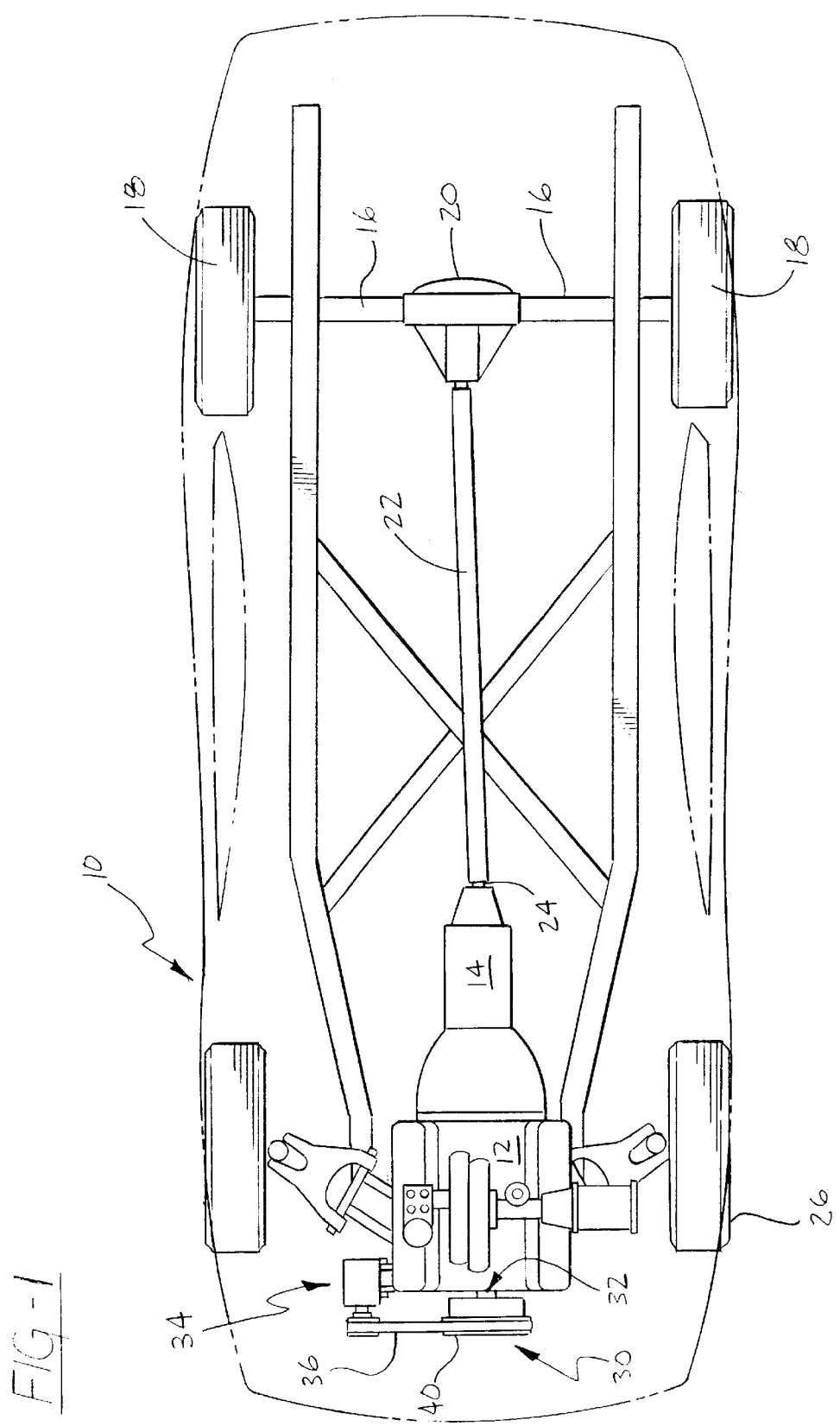
FIG. 1 is a top schematic view of an automotive drive train illustrating the general location of the torque-limiting accessory drive assembly of the present invention in a rear wheel drive motor vehicle application.

A motor vehicle having a rear-wheel drive system and incorporating the present invention is schematically illustrated in FIG. 1 and generally indicated at 10. The vehicle 10 includes a prime mover, such as an internal combustion engine 12, which drives a conventional transmission 14. Those having ordinary skill in the art will appreciate from the description that follows that the transmission 14 may be either a manual transmission with a clutch or an automatic transmission. The vehicle 10 further includes a pair of aligned, rear drive axles 16. The outer ends of the axles 16 are coupled to rear drive tire and wheel assemblies 18 and their opposite ends are coupled to and driven by a rear drive differential 20. The rear differential 20, in turn, is driven by a rear drive or prop shaft 22 which is, in turn, driven by an output shaft 24 of the transmission 14. Figure also depicts a set of front tire and wheel assemblies 26, which are coupled to various suspension and steering mechanisms (not shown) as required. It will be appreciated that the schematically illustrated vehicle of FIG. 1 is not complete, is shown for general reference, and is not part of the present invention.

In reference to the present invention, FIG. 1 shows a front-end accessory drive (FEAD) pulley 40 of a torque-limiting accessory drive assembly of the present invention, generally indicated at 30. The pulley 40 is rotatably disposed on the engine power take-off 32, shown in relative relation to an accessory, generally represented at 34. The torque-limiting accessory drive assembly 30 of the present invention is shown in FIG. 1 in use with an otherwise typical flexible belt-driven accessory system of a motor vehicle. By way of example, accessory 34 is shown operatively connected by belt 36 to the torque-limiting accessory drive assembly 30.

As shown in FIG. 2, a sleeve bushing, or bearing 42, is disposed between the FEAD pulley 40 and the engine power take-off 32 so that the FEAD pulley 40 may freely rotate relative to the engine power take-off 32. A drive belt engagement area is shown at 41, which is disposed about the outer circumference of the FEAD pulley 40 to engage with an accessory drive belt. By way of a non-limiting example, the drive belt engagement area 41 is illustrated in FIG. 2 as a serrated cross-section to represent usage with a flat "serpentine" type drive belt. It should be appreciated however, that the present invention may be used with any type of known operative drive connection.

The torque-limiting accessory drive assembly 30 also includes a center hub 44 that is splined at 45 to the engine power take-off 32. An intermediate race 46 is rotatably supported on a shoulder 48 of the FEAD pulley 40. A sleeve bushing 29 is disposed on shoulder 48 between the intermediate race 46 and the FEAD pulley 40 to allow them separate rotational movement. Together, the center hub 44 and intermediate race 46 define coextensive annular surfaces, as represented in FIG. 2 by 52 and 54, respectively.

The innermost end of the intermediate race 46, adjacent to the inner diameter of the center hub 44, includes a stepped portion upon which a sleeve bushing 56 is disposed to allow relative rotational movement between the intermediate race 46 and center hub 44.

A torque-limiting device, generally indicated at 60, is defined between the intermediate race 46 and the FEAD pulley 40. As shown, the preferred embodiment of the torque-limiting device is a multi-plate friction clutch. To this end, the inner diameter of the intermediate race 46 includes a splined portion 47 on which a plurality of separator plates 62 is supported for axial movement. Similarly, the FEAD pulley 40 includes a splined portion 49 on which is supported a plurality of friction plates 64 that are interleaved between the various separator plates 62. A Belleville spring 66 is disposed against the separator plates 62, as a rotary ring, and applies constant pressure to the separator plates 62 such that the friction clutch 60 translates a constant torque between the intermediate race 46 and the FEAD pulley 40. This friction clutch assembly 60 provides a constant friction connection between the intermediate race 46 and the FEAD pulley 40 and serves to set a maximum value for torque transfer.

A self-energizing, contracting spring, one-way clutch, is generally shown at 70. FIG. 3 depicts the one-way clutch 70 in cutaway view for illustrative detail. The one-way clutch 70 utilizes a wound spring member 74 that operatively disposed about the coextensive annular surfaces 52 and 54 of center hub 44 and intermediate race 46. The spring 74 is wrapped about both the center hub 44 and the intermediate race 46 in interference fit. The interconnection between the center hub 44 and the intermediate race 46 through the wound spring 74 functions to transfer torque between the hub and the intermediate race.

Specifically, this occurs as the center hub 44 and the intermediate race 46 are normally coupled together through the interference fit of the spring 74. Any relative rotation by the center hub 44 (drive member) in the direction of the spring's windings (as shown at 80) causes an increase in frictional drag and a winding of the spring 74 to occur. This winding of the spring 74 causes it to grip the both coextensive annular surfaces 52 and 54 of center hub 44 and intermediate race 46 tighter. As the center hub 44 rotates and the grip of spring 74 increases, torque is thereby transferred through the spring 74 to rotate the intermediate race 46 in the same direction as the center hub 44 (shown at 82, in FIG. 3) ultimately rotating the FEAD pulley 40 and driving the vehicle accessories.

In regard to the one-way operation of clutch 70, if either the center hub 44 (as the input, or driving member), or the intermediate race 46 (as the output, or driven member) were to turn in the opposite direction (i.e., opposite to the rotational directions shown as 80 and 82), the spring 74 would slip, allowing the shafts to freewheel. This is due to the nature of a wound spring, such that if one end is held stationary (in this case by the interference fit), rotation in the direction of the windings tightens the spring coils and rotation in the opposite direction opens, or loosens, the spring coils. In other words, in the normally understood operation of a self-energizing one-way spring clutch, rotation by either the driving, or the driven member in the opposite direction to the spring's windings would slightly unwind the spring and allow freewheeling movement of the shafts. However, in the case of the present invention, neither the engine power take-off 32, and thereby the center hub 44, nor the accessories, through the intermediate race 46, counter-rotate. Therefore, additional physical structure is necessary to disengage the mechanism.

To facilitate an unwinding of spring 74 and a release the intermediate race 46 from the center hub 44, a disengagement sleeve 72 is placed over the spring 74. The disengagement sleeve 72 has an inner diameter slightly larger than the spring outer diameter to allow for the winding and unwinding action of the spring 74. As best seen in FIG. 2A, the disengagement sleeve 72 has an extension tab 76 with a blunt or squared face 78 that extends inward from the inside diameter of the sleeve 72 to meet and oppose the squared inner end 71 of the spring 74 along the inner most end of the center hub 44. The disengagement sleeve 72 also has a plurality of release notches 77 defined on its outer diameter. A torque interruption assembly, generally shown at 90, is secured to a stationary portion of the vehicle by its base plate 96 and includes a solenoid 94 and a disengagement arm 92 that is operatively connected to the solenoid 94. When the solenoid 94 is activated, the disengagement arm 92 operatively engages one of the plurality of the release notches 77 of the disengagement sleeve 72.

During the normally engaged mode of operation, the engine power take-off 32 turns and the rotation of attached center hub 44 tightens the spring 74 causing a transfer of torque from the center hub 44 to the intermediate race 46, thereby driving the FEAD pulley 40 and the vehicle's accessories. As such, the spring 74 is constantly rotating along with the center hub 44 and intermediate race 46. The disengagement sleeve 72 also rotates with the spring 74 by virtue of having the face 78 of its inwardly directed extension tab 76 engaged on the end 71 of the spring 74.

When it is desirable to disengage the vehicle accessories, the torque-limiting accessory drive assembly 30 operates in the following manner. The solenoid 94 of the torque interruption assembly 90 is actuated to move the locking arm 92 from its normally retracted position (as shown in FIG. 2A) to engage one of the plurality of notches 77 on the rotating disengagement sleeve 72. As the locking arm 92 engages one of the notches 77, the disengagement sleeve's rotation is stopped and the spring 74, being held from its inner end 71 by the blunt, squared face 78 of extension tab 76, also stops rotating. This stopping and holding action placed on the spring 74 causes it to unwind and expand slightly; the center hub 44 is thereby released from the spring 74 and it continues to rotate, no longer transferring torque to the intermediate race 46. Without the torque transfer from the center hub 44, the intermediate race 46, and thereby the FEAD pulley 40 with its connected accessories will freewheel, stopping quickly due to mechanical forces. In this manner, the parasitic mechanical power drain to the engine from the driven accessories is removed.

Conversely, as soon as the locking arm 92 is retracted from the notches 77 of the disengagement sleeve 72, the spring 74 will rewind to its normal state, which reestablishes the interference fit and subsequently reengages the spring 74 to the center hub 44 for torque transfer through the clutch assembly 30. Therefore, during shifting of the transmission, at launch, or any other pre-selected operative disengagement mode, torque transfer may be interrupted to the FEAD pulley 40 by activating the disengagement solenoid 94, and may be then reestablished by deactivating the solenoid. In this way, torque transfer is selectively interruptible to all the accessories driven by the engine through the FEAD pulley 40.

Additionally, in the engaged, operative mode, the engine torque that is transferred from the engine power take-off 32, to the center hub 44, through the spring 74, to the intermediate race 46 first reaches the torque-limiting device 60 before being transferred to the FEAD pulley 40. The constant application of pressure on the torque-limiting device 60 by the Belleville spring 66 further translates the applied torque from the intermediate race 46 to the FEAD pulley 40 thereby driving the associated accessories. Thus, any desired maximum predetermined torque transfer capacity can by set within the clutch assembly 30 by the selection of a specific spring force to be applied by the Belleville spring 66. This is the torque transfer-limiting feature of the present invention. If a torque value greater than the holding pressure supplied by the Belleville spring 66 is applied across the spring 74 of the one-way clutch 70 to the intermediate hub 46, the torque-limiting device 60 will simply slip thereby passing the designed maximum, but not the excessive, torque to the FEAD pulley 40 and accessories. This operative limitation of the torque supplied to the accessories prevents spikes, high levels, or rapid changes of torque from reaching the vehicle's accessories.

Therefore, the torque-limiting accessory drive assembly of the present invention provides two functions. First, the torque-limiting device 60 of the present invention has the advantage in that it provides a selective, predetermined maximum torque transfer through the drive assembly 30 by allowing design adjustment through the choice of a specific spring force capacity of the supplied Belleville spring 66. It does this without the need for supplying hydraulic power, which is the typical mechanism used to engage multi-disc friction clutches that are known in the art. Second, the torque-limiting accessory drive assembly of the present invention is operatively selectable in its disengagement and engagement, thereby allowing controlled interruption of the engine torque that is transferred to the accessories.

We claim:

1. A torque-limiting accessory drive assembly comprising:

a pulley adapted to transfer torque from the power take-off of an internal combustion engine to an accessory drive system;

a torque limiting device operatively connected to said pulley and adapted to limit the maximum amount of torque transferred from the power take-off of an internal combustion engine to said pulley; and a one-way clutch assembly operatively interposed between the engine power take-off and said torque limiting device, said one-way clutch assembly acting to selectively transfer torque from the power take-off to said torque limiting device thereby providing motive force to said pulley and vehicle accessory drive, and acting to selectively interrupt torque transfer at predetermined times.

2. A torque-limiting accessory drive assembly as set forth in claim 1 wherein said one-way clutch is a contracting spring type clutch having a center hub defining a first outer annular surface operatively connected to the engine power take-off and an intermediate race defining a second outer annular surface located adjacent to said center hub such that said first and said second annular surfaces are substantially coextensive, a spring operatively wound about said first and second annular surfaces, a disengagement sleeve disposed about and in abutting engagement with said spring, and a torque interruption assembly operatively fixed to a stationary point, said spring adapted to operatively tighten and engage both said center hub and said intermediate race such that both said center hub and said intermediate race are operatively interconnected for common rotation to transfer torque between said center hub and said intermediate race when said center hub rotates in one predetermined direction, said spring also adapted to operatively loosen and disengage so as to interrupt torque transfer between said center hub and said intermediate race when said disengagement sleeve is held stationary by said torque interruption assembly.

3. A torque-limiting accessory drive assembly as set forth in claim 2 wherein said center hub and said intermediate race concomitantly form a coextensive annular surface about which said spring is disposed.

4. A torque-limiting accessory drive assembly as set forth in claim 3 wherein said spring is disposed in a helical wound manner about said coextensive annular surface such that spring is in a selective interference fit with said coextensive annular surface.

5. A torque-limiting accessory drive assembly as set forth in claim 2 wherein said spring has at least one end and said disengagement sleeve has an inwardly directed tab adapted to engage said at least one end of said spring.

6. A torque limiting accessory drive assembly as set forth in claim 5 wherein said disengagement sleeve has a plurality of notches extending from its outer circumference adapted to be operatively and selectively engaged by said torque interruption assembly.

7. A torque limiting accessory drive assembly as set forth in claim 6 wherein said torque interruption assembly includes a solenoid and a disengagement arm operatively connected to said solenoid, said solenoid operable to extend said disengagement so as to operatively engage at least one of said plurality of notches of said disengagement sleeve when extended.

8. A torque limiting accessory drive assembly as set forth in claim 7 wherein said solenoid is electrically connected to a controlled source of vehicle electrical power, said solenoid adapted to be selectively controlled such that the torque transfer of the torque-limiting accessory drive assembly is interruptible at certain times in vehicle operation.

9. A torque limiting accessory drive assembly as set forth in claim 1 wherein said torque limiting device having a friction plate clutch that includes a plurality of separator plates operatively connected to said intermediate race, and a plurality of friction plates operatively connected to said pulley, said friction plates cooperatively interposed between said separator plates such that said intermediate race and said pulley are operatively coupled to transfer torque from said intermediate race to said pulley.

10. A torque limiting accessory drive assembly as set forth in claim 9 wherein said friction plate assembly further includes a Belleville spring operatively connected to said intermediate race, said Belleville spring adapted to exert a coupling pressure to said separator plates and said friction plates such that torque is transferred between said intermediate race and said pulley through said friction plate clutch to a predetermined maximum valve as determined by the spring force exerted by said Belleville spring on said separator plates.

11. A torque limiting accessory drive assembly as set forth in claim 1 wherein said pulley is rotatively disposed about engine power take-off and is adapted about its outer circumference to operatively connect to a belt-driven accessory drive system.

12. A torque limiting accessory drive assembly comprising:

a pulley adapted to transfer torque from the power take-off of an internal combustion engine to an accessory drive system;

a contracting spring one-way clutch assembly having a center hub operatively connected to an engine power take-off, an intermediate race located adjacent to said center hub, a spring operatively wound about both said center hub and said intermediate race, a disengagement sleeve disposed about said spring, and a torque interruption assembly operatively fixed to a stationary point, said spring adapted to operatively tighten and engage both said center hub and said intermediate race such that both said center hub and said intermediate race are operatively joined when said center hub rotates in one particular direction, said spring also adapted to operatively loosen and disengage said center hub from said intermediate race when said disengagement sleeve is held stationary by a torque interruption assembly;

a friction plate clutch operatively interposed between said pulley and said one-way adapted to limit the maximum amount of torque transferred from said one-way clutch to said pulley.

13. A torque limiting accessory drive assembly as set forth in claim 12 wherein said center hub and said intermediate race concomitantly form a coextensive annular surface about which said spring is disposed.

14. A torque limiting accessory drive assembly as set forth in claim 13 wherein said spring is disposed in a winding manner about said coextensive annular surface such that spring is in interference fit with said coextensive annular surface.

15. A torque limiting accessory drive assembly as set forth in claim 14 wherein said torque interruption assembly further includes a solenoid and a disengagement arm operatively connected to said solenoid, said solenoid operable to extend said disengagement arm so as to operatively engage said disengagement sleeve when extended.

16. A torque limiting accessory drive assembly as set forth in claim 15 wherein said solenoid is electrically connected to a controlled source of vehicle electrical power, said solenoid adapted to be selectively controlled such that the torque transfer of the torque-limiting accessory drive assembly is interruptible at certain times in vehicle operation.

17. A torque limiting accessory drive assembly as set forth in claim 16 wherein said disengagement sleeve has a plurality of notches extending from its outer circumference adapted to accept said disengagement arm of said torque interruption assembly, said disengagement sleeve further having a tab extending inwardly from its inner circumference adapted to engage one end of said spring.

18. A torque limiting accessory drive assembly as set forth in claim 17 wherein said spring defines a blunt end at the inner end of its winding adapted to abut said tab of said disengagement sleeve such that said disengagement sleeve will rotate with said spring when said one-way clutch is engaged and will operatively stop and hold spring in place when disengagement sleeve's rotation is stopped by torque interruption assembly.

19. A torque limiting accessory drive assembly as set forth in claim 18 wherein said friction plate assembly further includes a Belleville spring, said friction plate assembly selectable to provide torque transfer to a maximum value as determined by the force exerted on the friction plate assembly by the Belleville spring.

* * * * *